United States Patent [19]
Berl et al.

[11] Patent Number: 5,940,390
[45] Date of Patent: Aug. 17, 1999

[54] MECHANISM FOR CONVEYING DATA PRIORITIZATION INFORMATION AMONG HETEROGENEOUS NODES OF A COMPUTER NETWORK

[75] Inventors: Steven H. Berl, Piedmont; Ulrica Tam, Belmont, both of Calif.

[73] Assignee: Cisco Technology, Inc., San Jose, Calif.

[21] Appl. No.: 08/833,834

[22] Filed: Apr. 10, 1997

[51] Int. Cl.$^6$ .................................................. G06F 13/00
[52] U.S. Cl. ..................... 370/389; 370/469; 395/200.57
[58] Field of Search ..................... 370/236, 384, 370/400, 401, 410, 412, 414, 426, 465, 469, 389, 522, 466; 395/200.57, 200.58

[56] References Cited

U.S. PATENT DOCUMENTS 5,416,769   5/1995   Karol ....................................... 370/414

OTHER PUBLICATIONS

Nilausen, Jesper—APPN Networks; John Wiley & Sons, Ltd. 1994; APPN Basics, 2:11–83.

Primary Examiner—Chi H. Pham
Assistant Examiner—Maikhanh Tran
Attorney, Agent, or Firm—Cesari and McKenna, LLP

[57] ABSTRACT

A mechanism conveys information pertaining to transmission priority (TP) levels of inbound packets transmitted over a heterogeneous network from a switching node to a hybrid node of the network. The mechanism comprises a packet-recognizing filter having a format that is generated by the hybrid node and dynamically transmitted to the switching node over a predefined communication channel of the network. The filter enables the switching node to classify the inbound packets and assign them appropriate TP levels.

21 Claims, 10 Drawing Sheets

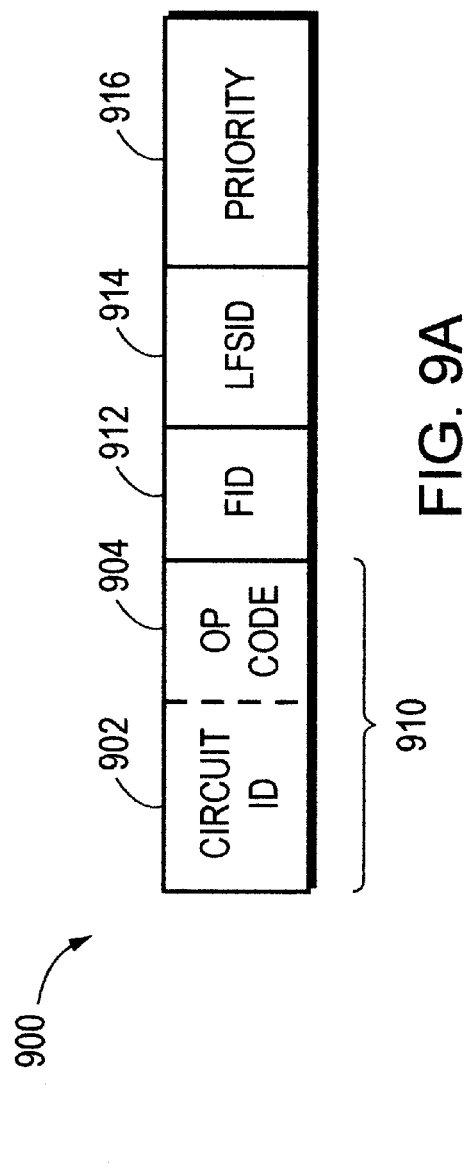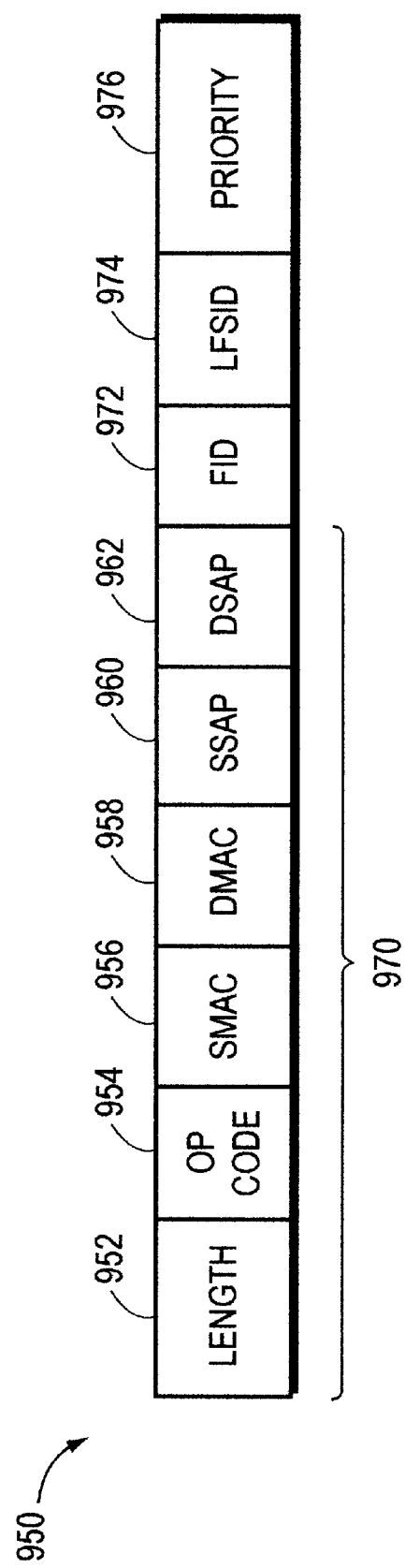

MECHANISM FOR CONVEYING DATA PRIORITIZATION INFORMATION AMONG HETEROGENEOUS NODES OF A COMPUTER NETWORK

CROSS-REFERENCE TO RELATED APPLICATIONS

This invention is related to the following copending U.S. patent application:

U. S. patent application Ser. No. 08/839,435, titled TECHNIQUE FOR MAINTAINING PRIORITIZATION OF DATA TRANSFERRED AMONG HETEROGENEOUS NODES OF A COMPUTER NETWORK. U.S. patent application Ser. No. 08/833,837, titled TECHNIQUE FOR CAPTURING INFORMATION NEEDED TO IMPLEMENT TRANSMISSION PRIORITY ROUTING AMONG HETEROGENEOUS NODES OF A COMPUTER NETWORK, which applications were filed on even date herewith and assigned to the assignee of the present invention.

U.S. patent application Ser. No. 08/926,539, titled TECHNIQUE FOR REDUCING THE FLOW OF TOPOLOGY INFORMATION AMONG NODES OF A COMPUTER NETWORK, which application was filed on Sep. 10, 1997 and assigned to the assignee of the present invention.

FIELD OF THE INVENTION

The invention relates to computer networks and, more particularly, to the distribution of packet prioritization information among stations of a computer network.

BACKGROUND OF THE INVENTION

Data communication in a computer network involves the exchange of data between two or more entities interconnected by communication links and sub-networks. These entities are typically software programs executing on hardware computer platforms, such as end stations and intermediate stations. Examples of an intermediate station may be a router or switch which interconnects the communication links and subnetworks to enable transmission of data between the end stations. A local area network (LAN) is an example of a subnetwork that provides relatively short distance communication among the interconnected stations; in contrast, a wide area network (WAN) enables long distance communication over links provided by public or private telecommunications facilities.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols.

The lower layers of these architectures are generally standardized and are typically implemented in hardware and firmware, whereas the higher layers are generally implemented in the form of software running on the stations attached to the network. Examples of such communications architectures include the Systems Network Architecture (SNA) developed by Inteerational Business Machines Corporation and the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 of the Internet architecture accepts industry standards defining a flexible network architecture oriented to the implementation of LANs.

Specifically, the network interface layer 120 comprises physical and data link sublayers. The physical layer 126 is concerned with the actual transmission of signals across the communication channel and defines the types of cabling, plugs and connectors used in connection with the channel. The data link layer, on the other hand, is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network and provides for environments that need connectionless or connection-oriented services at the data link layer.

Connection-oriented services at the data link layer generally involve three distinct phases: connection establishment, data transfer and connection termination. During connection establishment, a single path is established between the source and destination stations. This connection, e.g., an IEEE 802.2 LLC Type 2 or "Data Link Control" (DLC) connection as referred hereinafter, is based on the use of service access points (SAPs); a SAP is generally the address of a port or access point to a higher-level layer of a station. Once the connection has been established, data is transferred sequentially over the path and, when the DLC connection is no longer needed, the path is terminated. The details of such connection establishment and termination are well-known and, thus, will not be described herein.

The transport layer 114 and the internetwork layer 116 are substantially involved in providing predefined sets of services to aid in connecting the source station to the destination station when establishing application-to-application communication sessions. The primary network layer protocol of the Internet architecture is the Internet protocol (IP) contained within the internetwork layer 116. IP is primarily a connectionless network protocol that provides internetwork routing, fragmentation and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. The term TCP/IP is commonly used to refer to the Internet architecture.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process.

SNA is a mainframe-oriented network architecture that also uses a layered approach. The services included within this architecture are generally similar to those defined in the Internet communications architecture. In a SNA network, though, applications executing on end stations typically access the network through logical units (LU) of the stations; accordingly, in a typical SNA network, a communication session connects two LUs in a LU-LU session. Activation and deactivation of such a session is addressed by Advanced Peer to Peer Networking (APPN) functions.

The APPN functions generally include session establishment and session routing within an APPN network. FIG. 2 is a schematic block diagram of a prior art APPN network 200 comprising two end stations 202, 212, which are typically configured as end nodes (EN), coupled to token ring (TR) subnetworks 204, 214, respectively. During session establishment, an EN (such as EN 202) requests an optimum route for a session between two LUs; this route is calculated and conveyed to EN 202 by an intermediate station functioning as a network node server (e.g., station 206) via a LOCATE message exchange through the network 200. Thereafter, a "set-up" or BIND message is forwarded over the route to initiate the session. The BIND includes information pertaining to the partner LU requested for the session.

Intermediate session routing occurs when the intermediate stations 206, 216, configured as APPN network nodes (NN), are present in a session between the two end nodes. As can be seen, the APPN network nodes are further interconnected by a WAN 210 that extends the APPN architecture throughout the network. The APPN network nodes forward packets of an LU-LU session over the calculated route between the two APPN end nodes. An APPN network node is a full-functioning APPN router node having all APPN base service capabilities, including session services functions. An APPN end node, on the other hand, is capable of performing only a subset of the functions provided by an APPN network node. APPN network and end nodes are well-known and are, for example, described in detail in *Systems Network Architecture Advanced Peer to Peer Networking Architecture Reference* IBM Doc SC30-3422 and *APPN Networks* by Jesper Nilausen, printed by John Wiley and Sons, 1994, at pgs 11–83.

FIG. 3 is a schematic block diagram of the software architecture of a prior art APPN node 300. As noted, application 302 executing on an APPN end node, such as EN 202 of network 200, communicates with another end node, such as EN 212, through a LU-LU session; LU 304 within each end node functions as both a logical port for the application to the network and as an end point of the communication session. The session generally passes through a path control module 312 and a data link control (DLC) module 316 of the node, the latter of which connects to various network transmission media.

When functioning as an APPN router node, such as NN 206, an intermediate session routing (ISR) module 305 maintains a portion of the session in each "direction" with respect to an adjacent network node, such as NN 216 of network 200. In response to receiving the BIND message during session establishment, path control 312 and ISR 305 are invoked to allocate resources for the session. In particular, each NN 206, 216 allocates a local form session identifier (LFSID) for each direction of the session; the LFSID is thereafter appended to the packets in a SNA transmission header (TH) to identify the session context. Collectively, each of these individually-established "local" sessions form the logical communication session between the LUs 304 of the end nodes 202, 212.

When initiating a session, the application 302 specifies a mode name that is carried within the BIND message and distributed to all APPN network nodes; the LU 304 in each node uses the mode name to indicate the set of required characteristics for the session being established. Specifically, the mode name is used by control point (CP) module 308 of each APPN node 300 to find a corresponding class of service (COS) as defined in a COS table 310. The CP coordinates performance of all APPN functions within the node, including management of the COS table 310. The COS definition in table 310 includes a priority level specified by transmission priority (TP) information 320 for the packets transferred over the session; as a result, each APPN network node is apprised of the priority associated with the packets of a LU-LU session. The SNA architecture specifies four (4) TP levels: network priority, high priority, medium priority and low priority. Path control 312 maintains a plurality of queues 314, one for each TP level, for transmitting packets onto the transmission media via DLC 316.

Data link switching (DLSw) is a forwarding mechanism for the SNA architecture over an IP backbone network, such as the Internet. A heterogeneous DLSw network is formed when two DLSw switches interconnect the end nodes of the APPN network by way of the IP network; the DLSw switches preferably communicate using a switch-to-switch protocol (SSP) that provides packet "bridging" operations at the LLC (i.e., DLC) protocol layer. FIG. 4 is a schematic block diagram of a prior art DLSw network 400 comprising DLSw switches 406, 416 interconnecting ENs 402, 412 via IP network 410. The DLSw forwarding mechanism is also well-known and described in detail in *Request for Comment* (RFC) 1795 by Wells & Bartky, 1995 at pgs 1–91.

According to the DLSw technique, a lower-layer DLC connection is established between each EN and DLSw switch; however, these connections terminate at the switches 406, 416. In order to provide a complete end-to-end connection between the end nodes, the DLC connections are "disposed" over a reliable, higher-layer transport mechanism, such as TCP sessions. DLSw switches can establish multiple, parallel TCP sessions using well-known port numbers. All packets associated with a particular DLC connection typically follow a single, designated TCP session. Accordingly, SNA data frames originating at a sending EN 402 are transmitted over a particular DLC connection along TR 404 to DLSw switch 406, where they are encapsulated within a designated TCP session as packets and transported over IP network 410. The packets are received by DLSw switch 416, decapsulated to their original frames and transmitted over a corresponding DLC connection of TR 414 to EN 412 in the order received by switch 406 from EN 402.

Typically, all packets transmitted by DLSw switch 406 over a DLC connection/TCP session flow at the same priority level from a single output queue 405 of the switch and arrive at an output queue 415 of DLSw switch 416 in the same order in which they are transmitted. When the switches are configured as bridges to forward packets over a TCP session through the IP network, prioritization is straightforward. However, it may be desired to integrate the functions of an APPN network node within switch 406 by overlaying an APPN layer onto a DLSw layer of the switch; the resulting hybrid node may prioritize the packets at the APPN layer in an order governed by the TP information levels.

A problem that arises when deploying a hybrid node in such a heterogeneous network is that the TP priority information is lost when passing the packets between the APPN and DLSw layers, primarily because the TP information is not encapsulated within the packets. That is, the APPN layer has knowledge of the TP levels associated with the packets of a LU-LU session as a result of the BIND message exchange during session establishment; yet that information is not encapsulated within the associated packets and, thus, is not conveyed beyond the APPN layer. An example of a tagging mechanism suitable for use with the present invention that conveys TP levels from the APPN layer to the DLSw layer is disclosed in copending and commonly-assigned U.S. patent application, titled *Technique for Maintaining Prioritization of Data Transferred Among Heterogeneous Nodes of a Computer Network*, filed herewith and incorporated by reference as though fully set forth herein.

As described in the commonly-assigned application, the APPN protocol layer of the hybrid node assigns a TP level to each packet and passes that priority information to the DLSw layer of the node via an application programming interface extension. The TP level is converted to information that is "tagged" to each packet and the DLSw layer allocates each tagged packet to a TCP session based on the assigned TP level. The tagged information is then encapsulated within an IP header to enable intermediate routers to maintain the order and priority of the packet as it is transmitted outbound over the IP network to a receiving DLSw switch.

However, the tagged information within the IP header is not discernible to the receiving DLSw switch and, thus, the switch has no knowledge of the TP level associated with the outbound packet. If that packet requests a response, the DLSw switch cannot select, on the basis of priority, the proper TCP session over which to transmit a corresponding inbound packet; accordingly, the switch arbitrarily chooses a session. If the chosen TCP session has a lower designated priority than the session carrying the outbound packet, network throughput may be negatively impacted.

One solution to this problem is to deploy another hybrid node in place of the receiving DLSw switch. This approach is undesirable primarily because a goal of heterogeneous network design is to minimize the number of hybrid nodes in the network. A reason for minimizing the number of hybrid nodes is that such nodes require additional processing and memory resources, thereby resulting in expensive deployments. The present invention is directed to solving the problem of distributing packet prioritization information, assigned by a hybrid node of a heterogeneous network, to switching nodes of the network.

SUMMARY OF THE INVENTION

The invention comprises a mechanism for conveying information pertaining to transmission priority (TP) levels of inbound packets transmitted over a heterogeneous network from a switching node to a hybrid node of the network. The mechanism comprises a packet-recognizing filter having a novel format that is generated by the hybrid node and dynamically transmitted to the switching node over a predefined communication channel of the network. As described further herein, the filter enables the switching node to classify the inbound packets and assign them appropriate TP levels.

In the illustrative embodiment, the heterogeneous network is preferably a data link switching (DLSw) network with end nodes interconnected by way of an Internet protocol (IP) backbone network and the hybrid node is an advanced peer-to-peer networking (APPN) node with DLSw capabilities. Applications executing on the end nodes communicate via logical unit to logical unit (LU-LU) sessions, whereas the switching node communicates with the APPN node using a switch-to-switch protocol (SSP) over data link control (DLC) connections associated with the LU-LU sessions of the DLSw network; these DLC connections are further overlayed onto existing transmission control protocol (TCP) sessions of the IP network. Preferably, each TCP session is further associated with a TP level.

According to aspects of the invention, the predefined communication channel may be implemented as either an in-band channel over one of the existing TCP sessions using novel extensions to SSP, or an out-band channel over a newly-created TCP session. The format of the filter is preferably customized for each channel implementation; nevertheless, each filter includes a unique opcode identifying the filter, a format identifier (FID) denoting the format of a specific inbound packet, a local form session identifier (LFSID) that classifies the LU-LU session context of the specific packet and a priority identifier specifying the TP level of the packet.

Operationally, an APPN protocol layer of the APPN node passes the op-code, LFSID, FID and priority identifier to a DLSw protocol layer of the node, through an application programming interface (API), during establishment of the LU-LU session. In response to the API, the DLSw layer encapsulates these identifiers within fields of the filter and transfers the filter over the communication channel to the switching node. When transferring the filter over the in-band communication channel, the opcode is encapsulated within a SSP header, whereas for the out-band channel embodiment, additional addressing information is encapsulated with the opcode in fields of a defined header.

Upon receiving the filter, a DLSw layer of the switching node stores the LFSID, FID and priority identifier and proceeds to examine each inbound packet prior to forwarding it to the APPN node. Specifically, the switching node initially determines the format of each packet and if it matches the stored FID, the node compares the LFSID of the inbound packet with the stored LFSID to identify the LU-LU session context of the packet. If the values of these latter identifiers match, the switching node assigns to the inbound packet the TP level specified by the stored priority identifier and forwards the packet to the APPN node over an appropriate one of the existing TCP sessions.

BRIEF DESCRIPTION OF THE DRAWINGS

The above and further advantages of the invention may be better understood by referring to the following description in conjunction with the accompanying drawings in which like reference numbers indicate identical or functionally similar elements:

FIGS. 9A and 9B are schematic block diagrams depicting formats of the novel packet-recognizing filter of FIG. 8;

DETAILED DESCRIPTION OF ILLUSTRATIVE EMBODIMENT

Figure 5:
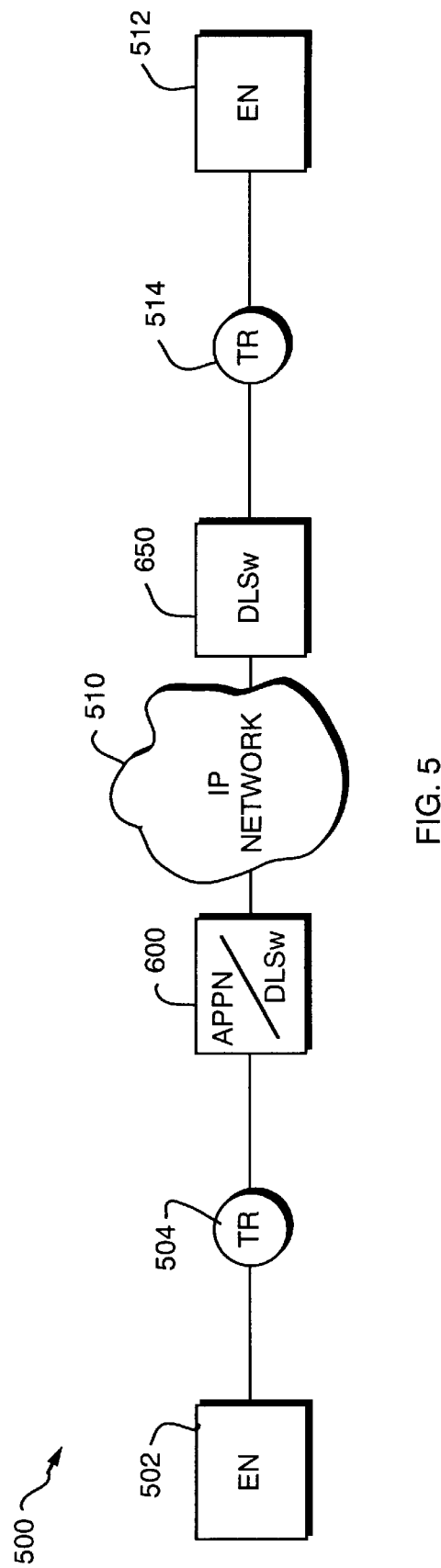
FIG. 5 is a block diagram of a heterogeneous computer network, including a DLSw node and an APPN/DLSw hybrid node for interconnecting various subnetworks and communication links on which the present invention may advantageously operate.

FIG. 5 is a block diagram of a computer network 500 comprising a collection of interconnected communication links and subnetworks attached to a plurality of stations. The stations are typically computers comprising end stations 502, 512 and intermediate stations 600, 650. Preferably, the end stations are Advanced Peer to Peer Networking (APPN) end nodes, although the stations may comprise other types of nodes such as Low Entry Networking nodes or Physical Units 2.0 via Dependent Logical Unit Requestor functions. In addition, the intermediate station 650 is a data link switching (DLSw) node and intermediate station 600 is an APPN/DLSw hybrid node.

Each node typically comprises a plurality of interconnected elements, such as a processor, a memory and a network adapter. The memory may comprise storage locations addressable by the processor and adapter for storing software programs and data structures associated with the inventive filtering mechanism and techniques. The processor may comprise processing elements or logic for executing the software programs and manipulating the data structures. An operating system, portions of which are typically resident in memory and executed by the processor, functionally organizes the node by, inter alia, invoking network operations in support of software processes executing on the node. It will be apparent to those skilled in the art that other processor and memory means, including various computer readable media, may be used for storing and executing program instructions pertaining to the techniques described herein.

The subnetworks included within network 500 are preferably local area networks (LANs) and the communication links may include wide area network (WAN) links; in the illustrative embodiment of the invention, the LANs are preferably token rings (TR) 504, 514 and an IP network 510, which may comprise either a LAN and/or a WAN configuration such as X.25, interconnects the nodes 600, 650. Communication among the nodes coupled to the network 500 is typically effected by exchanging discrete data packets or frames via connection-oriented service sessions between the communicating nodes.

Figure 3:
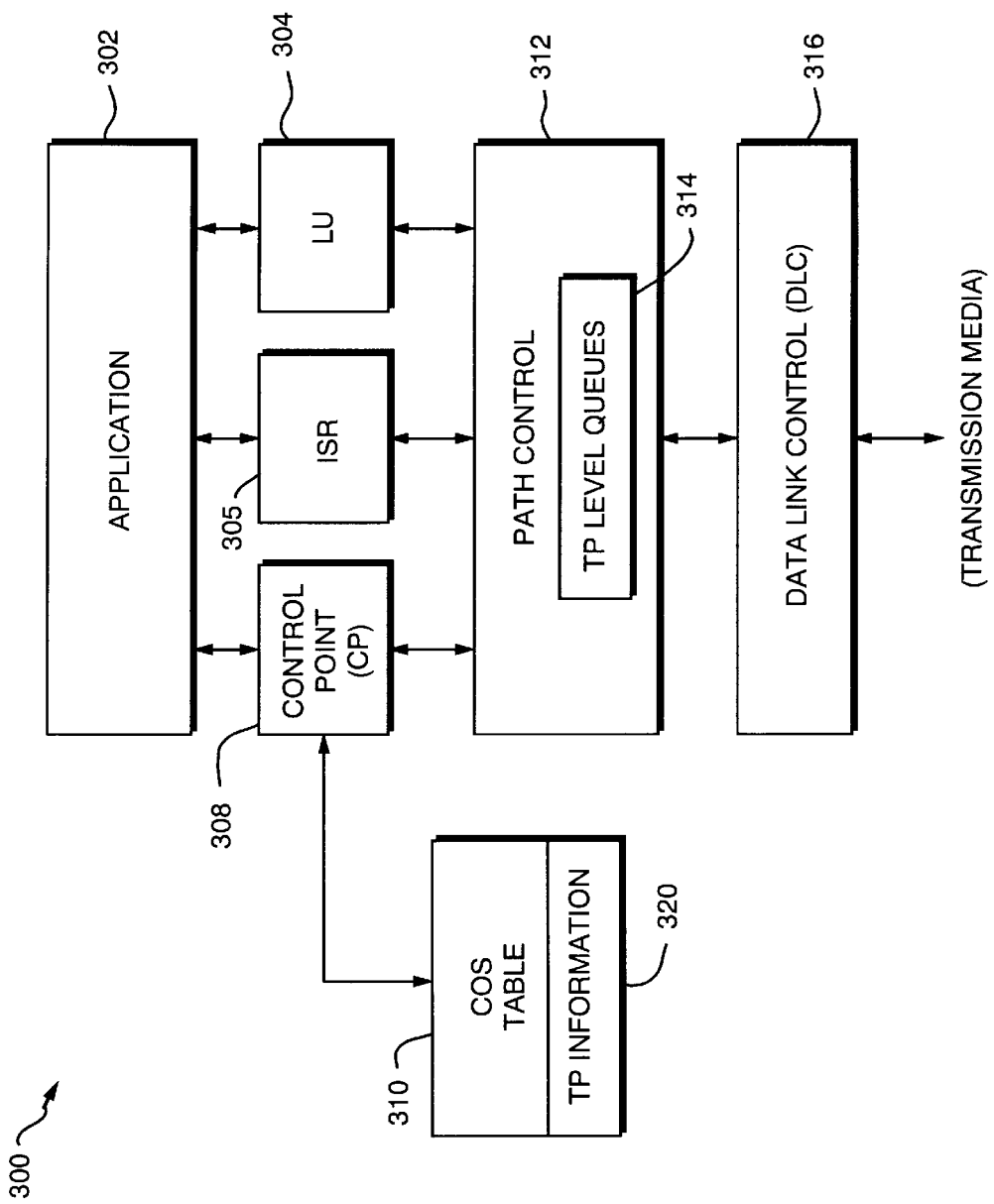
FIG. 3 is a schematic block diagram of the software architecture a prior art APPN node.
Figure 6:
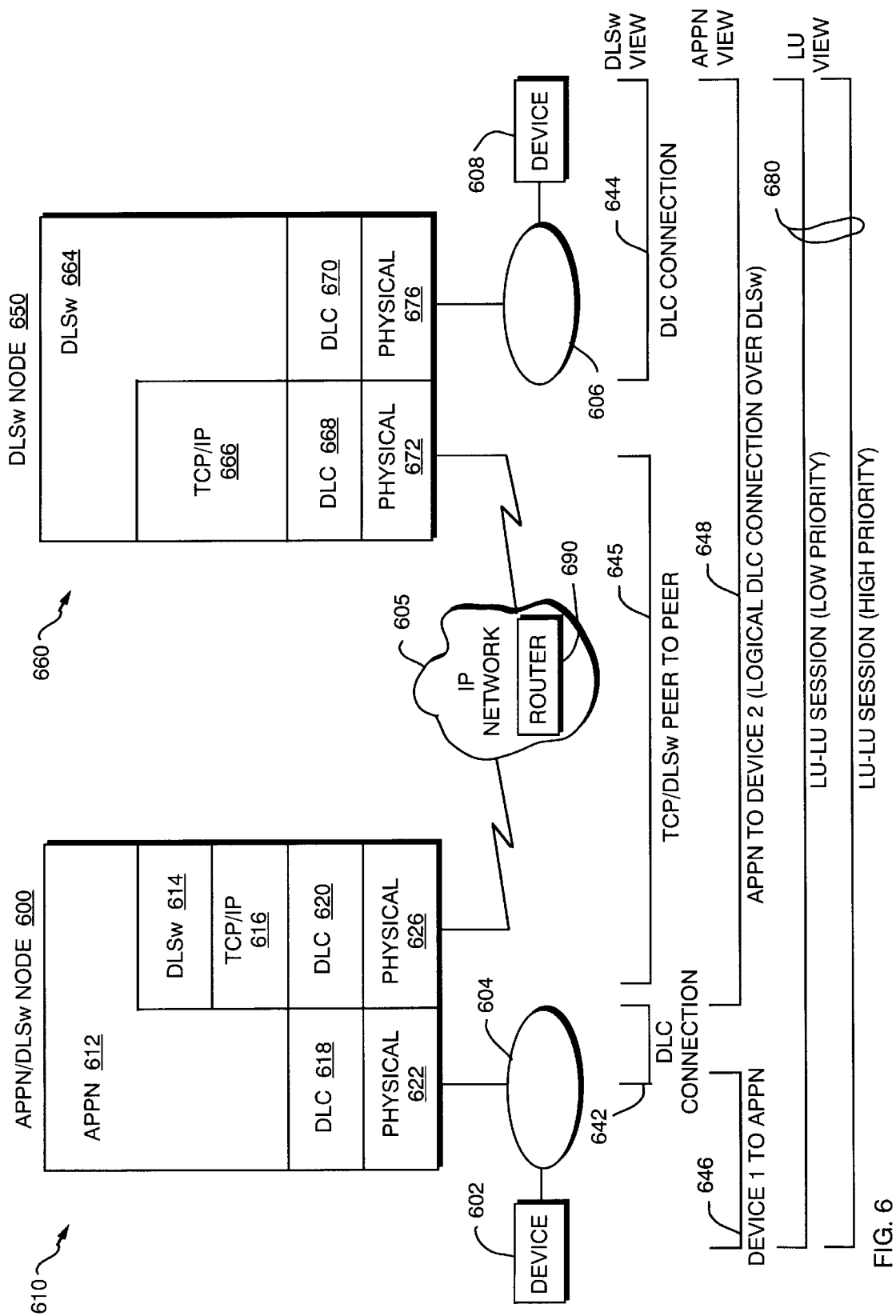
FIG. 6 is a schematic block diagram of protocol stacks contained within the DLSw and APPN/DLSw nodes of FIG. 5.

Heterogeneous (DLSw) network 500 is formed when APPN/DLSw hybrid node 600 is connected to DLSw node 650 via IP network 510. FIG. 6 is a schematic block diagram of protocol stacks 610, 660 within the nodes 600 and 650, respectively. Applications executing on SNA devices (end stations) 602, 608 typically access the network through logical units (LUs) of the stations and communicate via LU-LU sessions. Hybrid node 600 functions to facilitate establishment and routing of these connection-oriented communication sessions within the network. To this end, protocol stack 610 preferably comprises an APPN layer 612 that contains the software modules described in FIG. 3.

Figure 1:
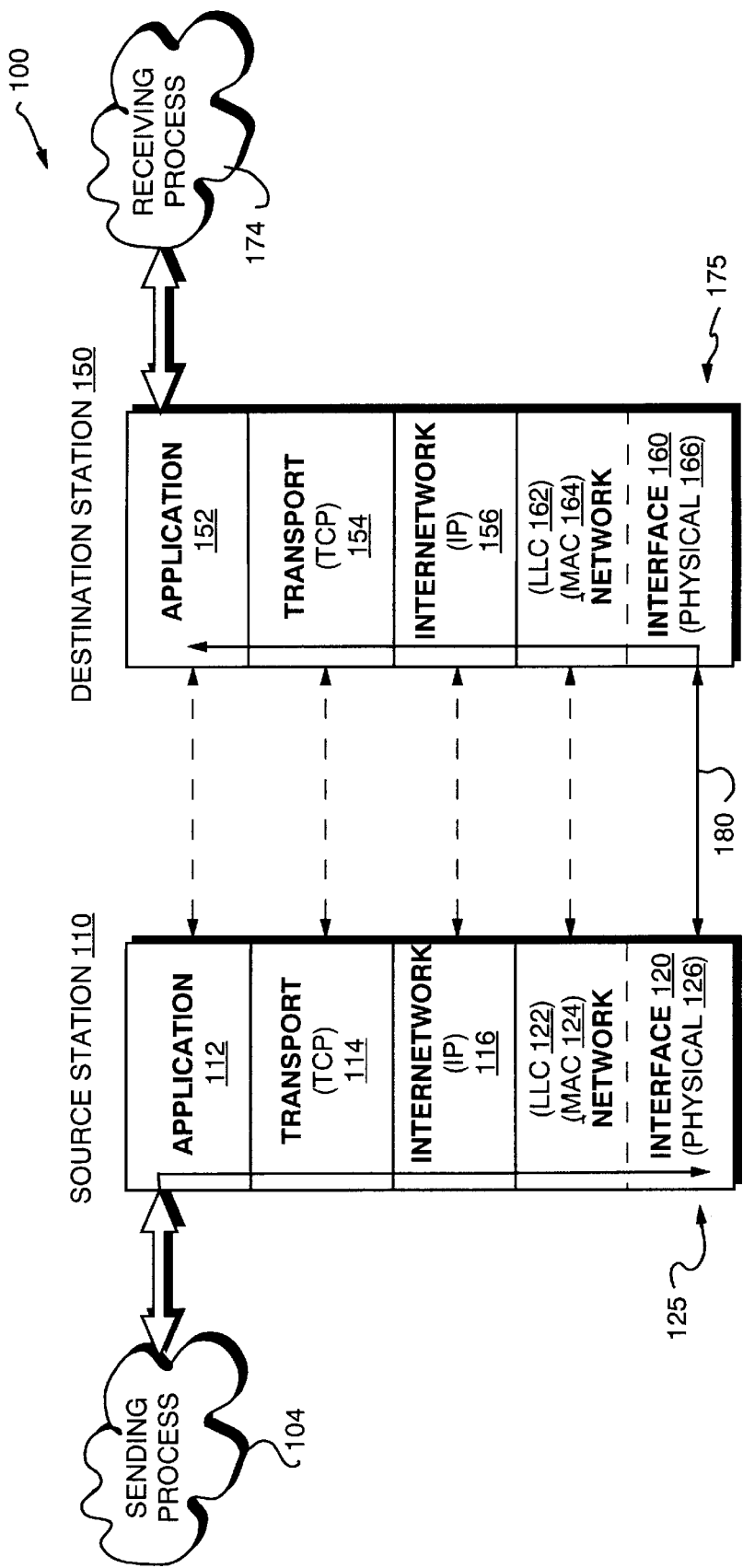
FIG. 1 is a schematic block diagram of prior art communications architecture protocol stacks, such as the Internet protocol stack, used to transmit data between stations of a computer network.
Figure 2:
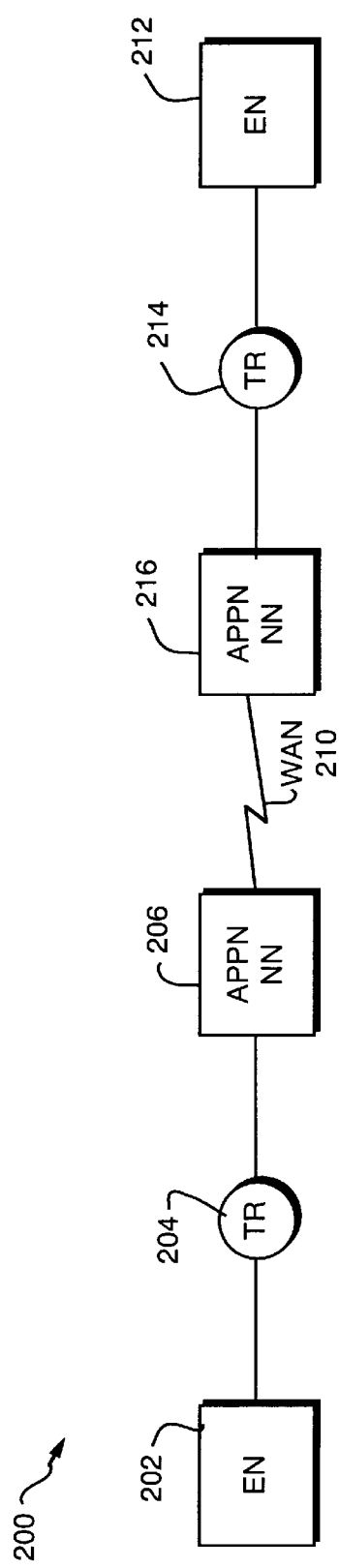
FIG. 2 is a schematic block diagram of a prior art Advanced Peer to Peer Networking (APPN) network including APPN nodes.
Figure 4:
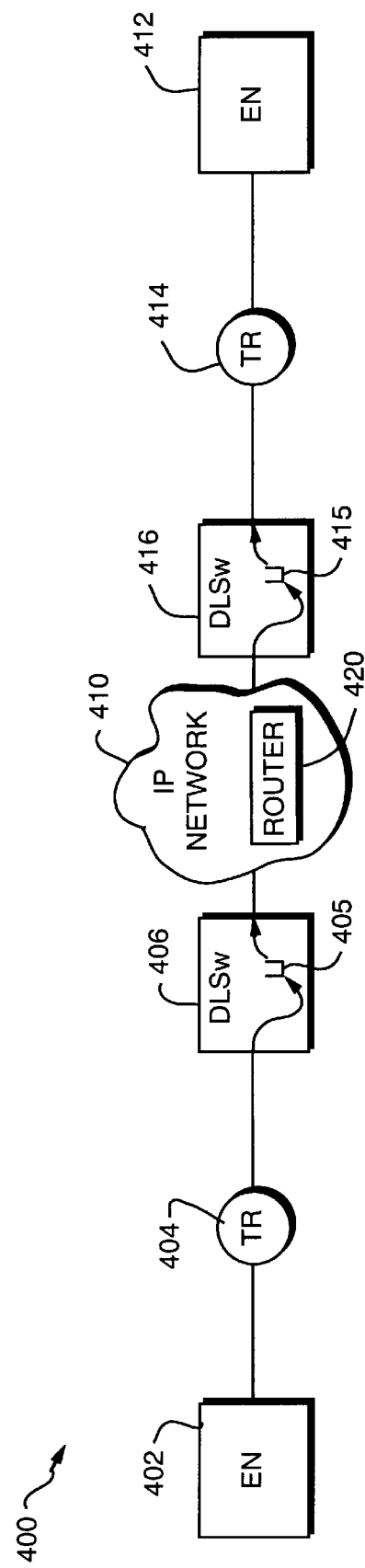
FIG. 4 is a schematic block diagram of a prior art data link switching (DLSw) network.

The stack 610 also includes a Transmission Control Protocol/Internet protocol (TCP/IP) layer 616 containing those layers of the Internet communications architecture protocol stack (FIG. 1) needed to establish, e.g., conventional connection-oriented, TCP communication sessions. Physical sublayers 622 and 626 specify the electrical, mechanical, procedural and functional specifications for activating, maintaining and de-activating the physical links 604 and 605 of the network. Protocol stack 660 of DLSw node 650 likewise includes a TCP/IP layer 666 and physical sublayers 672 and 676, which are functionally equivalent to those layers of protocol stack 610.

Each node 600, 650 further contains a DLSw layer 614, 664 and data link control (DLC) layers 618, 620 and 668, 670, respectively, the latter layers providing a connection-oriented service via conventional DLC connections. The DLSw layers provide a mechanism for forwarding data frame traffic between devices 602, 608 over IP network 605. Preferably, the DLSw layers 614, 664 cooperate in a peer-relationship and communicate via a switch-to-switch protocol (SSP) to, inter alia, define TCP sessions over the IP network.

In the illustrative embodiment, there are a plurality of connection/session "views" established within the network. For example, from an APPN view, there is a DLC connection 646 between device 602 and APPN layer 612 of node 600, and a DLC connection 648 between APPN layer 612 and device 608. From a DLSw view, there is a DLC connection 642 between APPN layer 612 and DLSw layer 614 of node 600, and a DLC connection 644 between DLSw layer 664 and device 608; in order to provide reliable, end-to-end connections between the devices, these DLC connections are "overlayed" onto TCP sessions (denoted 645) between the two DLSw layers 614, 664. Lastly, from a LU view, there are multiple LU-LU sessions 680 (at various priority levels) between the LUs of devices 602 and 608.

It should be noted that the TCP sessions are initiated between DLSw peers 614, 664 in accordance with a conventional TCP transport protocol. Thereafter, SSP control messages are exchanged between the DLSw layers 614, 664 of the nodes to establish an end-to-end DLSw circuit over the session. Information contained within these control messages are used to generate a DLSw circuit identifier (ID) that associates the DLSw circuit with the session. Preferably, the DLC connections 642, 644 overlayed on the TCP session 645 "map" to the DLSw circuit. The generation of DLSw circuits and identifiers is described in Request for Comment (RFC) 1795 by Wells & Bartky, 1995, while the establishment of multiple TCP sessions between DLSw peer layers is described in both RFC 1795 and *Internetworking with TCP/IP* by Comet and Stevens, printed by Prentice Hall, 1991; all of these publications are hereby incorporated by reference as though fully set forth herein.

Figure 7:
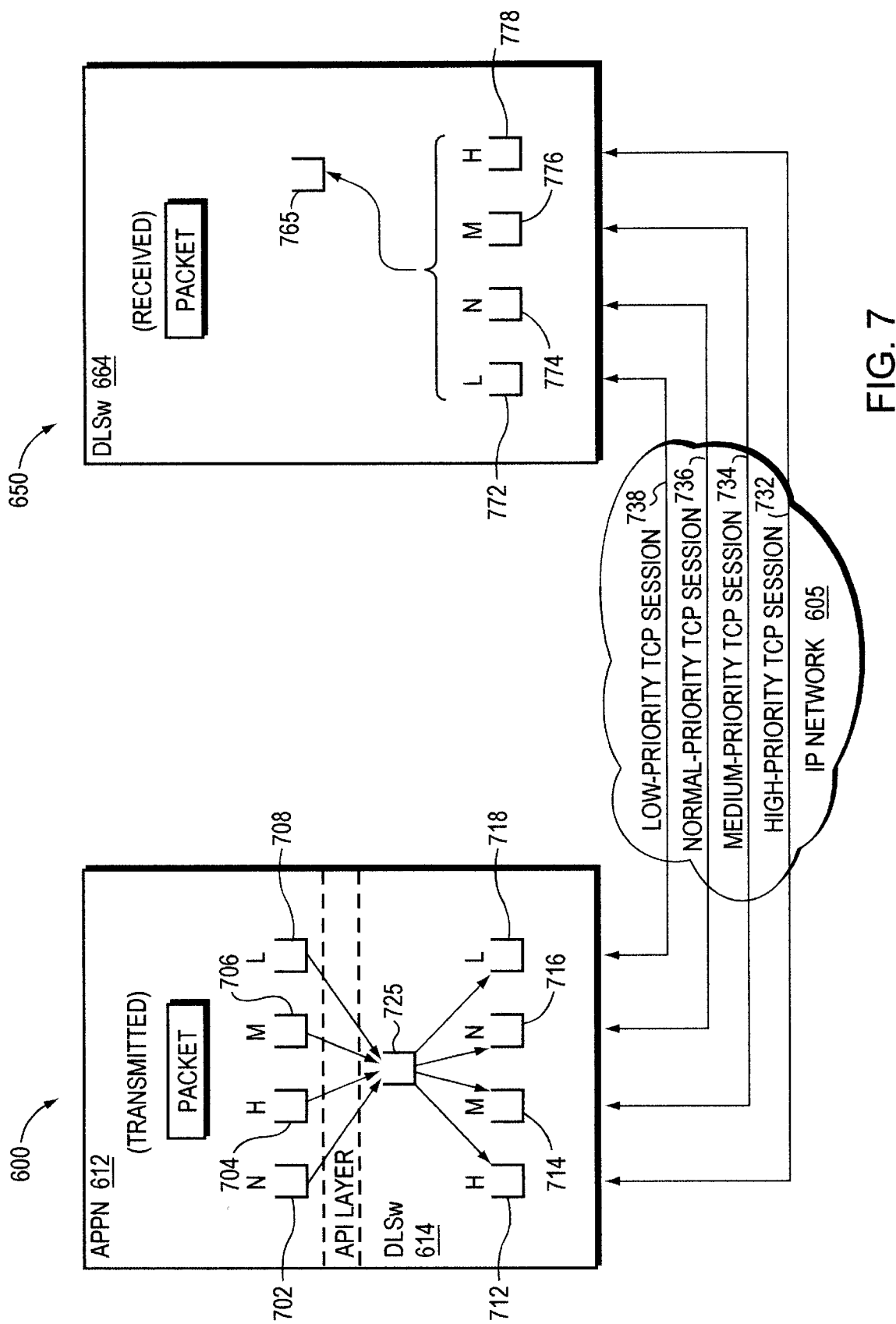
FIG. 7 is a schematic block diagram illustrating the assignment of priority levels among established communication sessions and the distribution of packets among the sessions.

Typically, packets transmitted by a DLSw switch over a TCP session flow at the same priority level from a single output queue of the switch and arrive at a peer DLSw switch in the same order in which they are transmitted. Hybrid node 600 may, however, prioritize the packets of a LU-LU session at the APPN layer 612 in an order specified by transmission priority (TP) information contained within the node 600. FIG. 7 is a schematic block diagram illustrating the assignment of TP levels among established communication sessions and the distribution of packets among those sessions.

A path control module 312 (FIG. 3) of the APPN layer 612 within node 600 maintains four queues 702-708, one for each TP level, for transmitting data packets (received from DLC connection 646) over established TCP sessions 645 of the network. As described above, TCP sessions are established through the IP network 605 in accordance with conventional TCP/IP transport mechanisms within the APPN/DLSw node 600 and the DLSw node 650; illustratively, these nodes cooperate in a peer-relationship to establish multiple, parallel TCP sessions 732-738 over the network.

The tagging mechanism of the commonly-assigned application incorporated by reference herein allows the hybrid node 600 to convey a TP level from its APPN layer 612 to its DLSw layer 614, convert that TP level to information that is "tagged" to each outbound packet, and allocate the tagged packet to a TCP session based on the assigned TP level. Specifically, the DLSw layer 614 loads the packets into the queue 725 and then distributes them among four queues 712–718. Each TCP session (and queue) is preferably associated with a TP level; for example, session 732 (and queue 712) are assigned a high-priority level, session 734 (and queue 714) are assigned a medium-priority level, session 736 (and queue 716) are assigned a normal-priority level and session 738 (and queue 718) are assigned a low-priority level.

The tagged information is encapsulated within an IP header of the packet prior to outbound transmission over the IP network 605 to the DLSw node 650. As noted, the tagged information is not discernible to the DLSw node 650 and, if required to respond to the packet, that node cannot select, on the basis of priority, the proper TCP session over which to transmit a corresponding inbound packet because it has no knowledge of the TP level associated with the outbound packet.

Figure 8:
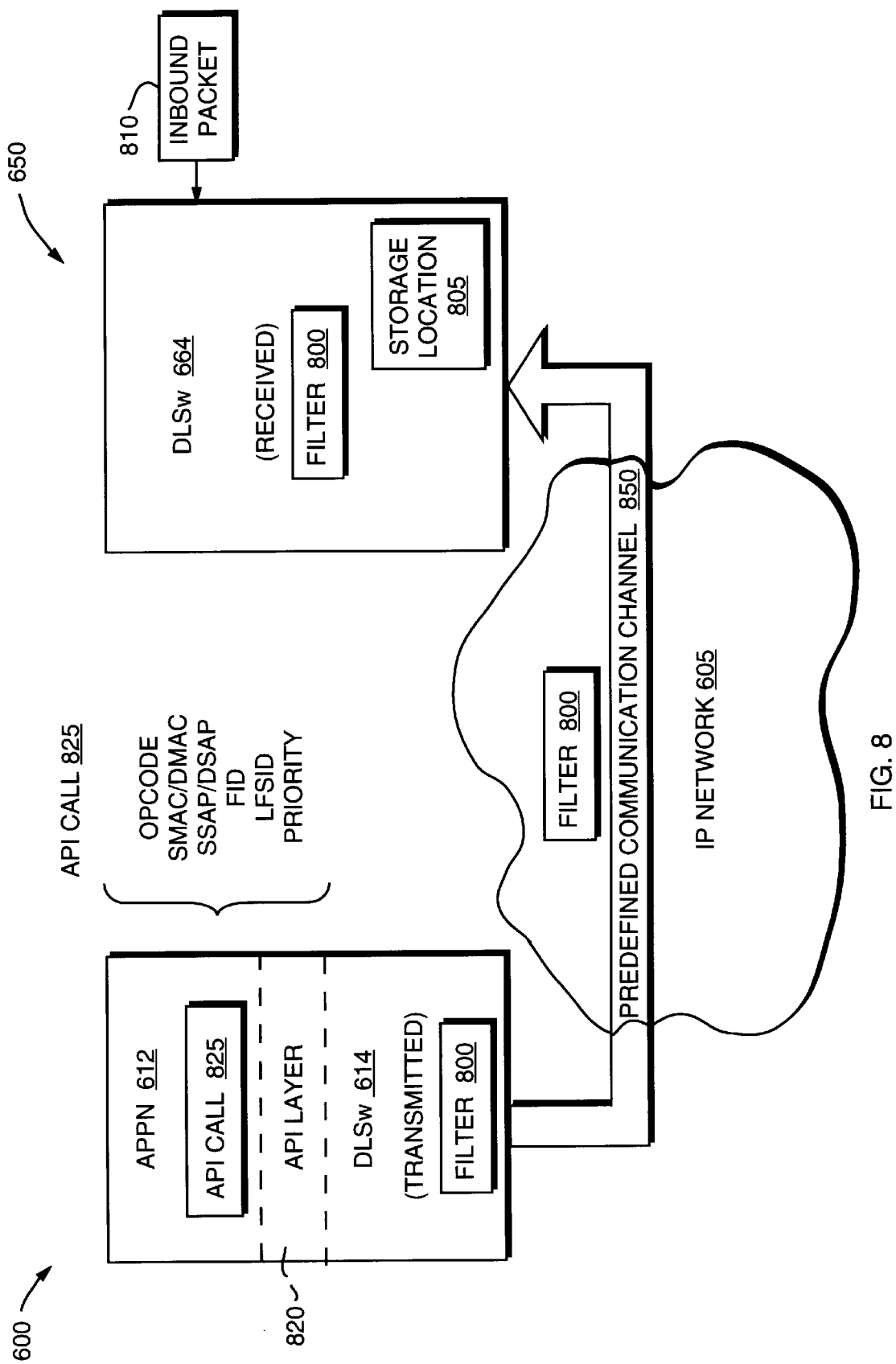
FIG. 8 is a schematic block diagram of a novel packet-recognizing filter generated by the hybrid node of FIG. 5 and dynamically transmitted to the DLSw node over a predefined communication channel in accordance with the invention.

In accordance with the present invention, a mechanism is provided for conveying the TP level of an inbound packet transmitted over a heterogeneous network from DLSw node 650 to hybrid node 600. Referring to FIG. 8, the mechanism comprises a packet-recognizing filter 800 having a novel format that is generated by the hybrid node 600 and dynamically transmitted to DLSw node 650 over a predefined communication channel 850 of IP network 605. As described further herein, the filter 800 enables the switching node 650 to classify each inbound packet 810 and assign it an appropriate TP level.

According to an aspect of the invention, the predefined communication channel 800 may be implemented as either an in-band channel over one of the existing TCP sessions 732–738 using novel extensions to SSP, or an out-band channel over a newly-created TCP session. For this latter channel implementation, the newly-created TCP session is established in accordance with the conventional TCP transport protocol described above.

In another aspect of the invention, the format of filter 800 is preferably customized for each channel implementation, as depicted in FIGS. 9A and 9B. For each case, the filter includes a well-defined, unique opcode identifying the filter used in the illustrative network configuration, a format identifier (FID) denoting the format of a specific inbound packet, a local form session identifier (LFSID) that classifies the LU-LU session context of the specific packet and a priority identifier specifying the TP level of the packet.

FIG. 9A illustrates the format 900 of the filter 800 configured for transfer over the in-band communication channel. Here, the opcode 904 is encapsulated by DLSw layer 614 within a SSP header 910 along with the DLSw circuit ID 902; since the circuit ID 902 associates an end-to-end DLSw circuit with the LU-LU session of the specific inbound packet, additional addressing information is not needed. Such additional addressing information comprises media access control (MAC) addresses of the source node (SMAC) and destination node (DMAC) which, for this example, are nodes 600 and 650, respectively, and service access points (SAP) addresses of the source (SSAP) and destination (DSAP) nodes.

The format 900 further stores the FID, LFSID and priority identifiers within fields 912–916, respectively. The contents of these identifiers (along with the additional addressing information) are provided by the APPN layer 612 (FIG.8) to the DLSw layer 614 via an application programming interface (API) layer 820 using a data control flow mechanism, such as an API call 825.

FIG. 9B illustrates the format 950 of the filter 800 configured for transfer over the out-of-band channel embodiment. Since a new TCP session is created for this channel embodiment, the additional addressing information passed from the APPN layer 612 to the DLSw layer 614 via the API call 825 is used in format 950. Specifically, a defined header 970 is generated by DLSw layer 614 for encapsulating the opcode in field 954, SMAC in field 956, DMAC in field 958, SSAP in field 960 and DSAP in field 962; a value specifying the length of the filter is stored in field 952 of the header 970. The format 950 further accomodates the FID, LFSID and priority identifiers within fields 972–976, respectively.

Figure 10:
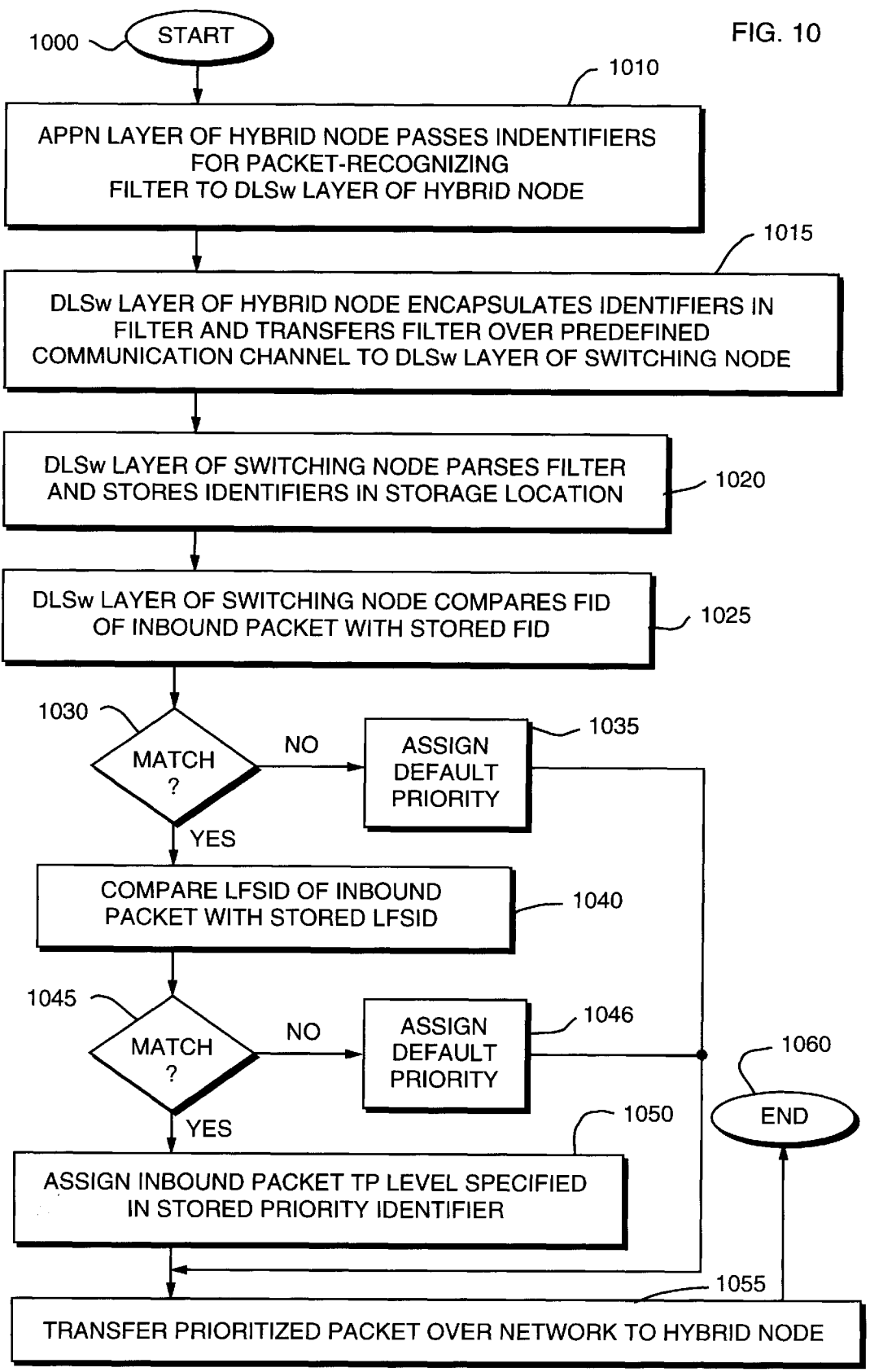
FIG. 10 is a flowchart illustrating use of the novel filter in accordance with the present invention.

Operation of the present inventive filter mechanism will now be described in connection with the flowchart of FIG. 10. The operation starts at Step 1000 and proceeds to Step 1010 where APPN protocol layer 612 of hybrid node 600 passes filter-identifying information, such as the opcode, LFSID, FID and priority identifier, to DLSw protocol layer 614 through API layer 820 during establishment of the LU-LU session. In response to the API, the DLSw layer encapsulates these identifiers within fields of the filter as described above and transfers the filter over the communication channel 850 to the DLSw switching node 650 in Step 1015.

Figure 11:
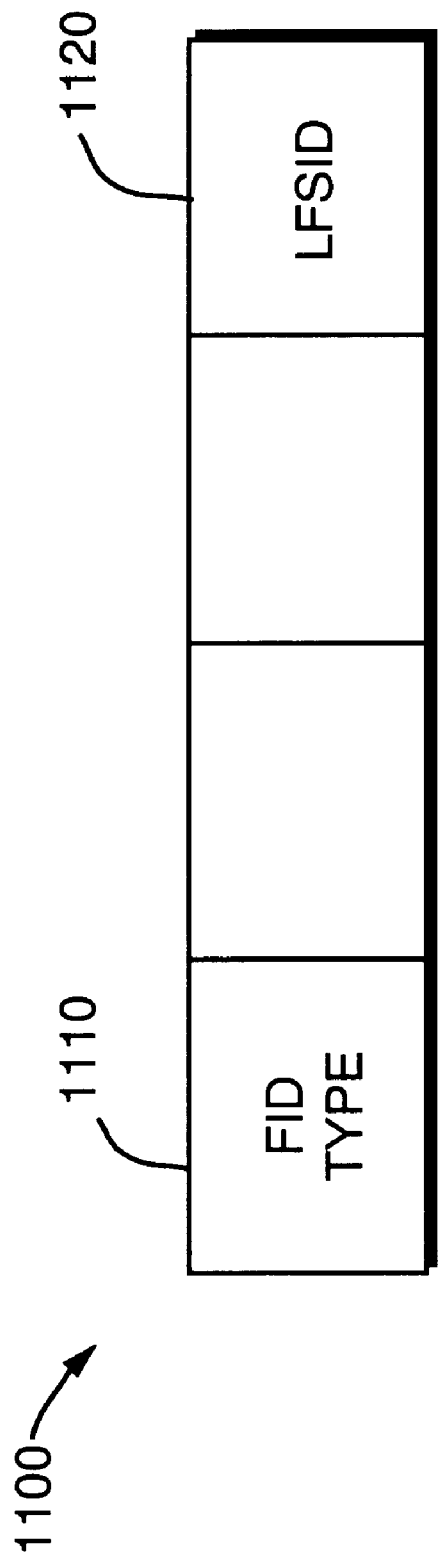
FIG. 11 is a schematic block diagram depicting the format of a conventional transmission header upon which the inventive packet-recognizing filter may advantageously operate.

Upon receiving the filter, DLSw layer 664 of the switching node 650 interprets the opcode as describing the type of message as a filter, parses the fields of the filter and stores the LFSID, FID and priority identifier in a temporary storage location 805 of, e.g., the memory of node 650 (Step 1020). The layer 664 then proceeds to examine each inbound packet 810 prior to forwarding it to the APPN node 600. The inbound packets are typically Systems Network Architecture (SNA) type frames generated by SNA devices coupled to the DLSw network; these frames are, in turn, typically encapsulated with conventional SNA transmission header (TH) headers. FIG. 11 is a schematic block diagram of the format 1100 of the TH header that DLSw layer 664 of node 650 is configured to operate on using the packet-recognizing filter 800.

Specifically, the switching node determines the format of each inbound packet by initially examining the contents of a FID type field 1110 of the TH header and comparing them with the stored FID identifier in Step 1025. It should be noted that the switching node is configured to recognize the format of TH header and, thus, can access the contents of any particular fields contained therein. The SNA architecture defines several different types of packet formats; in the illustrative embodiment, a FID2 format is preferably used for communication among the SNA devices 602,608. If the contents of the FID type field do not match the contents of the stored FID (Step 1030), a default priority is assigned to the inbound packet by the switching node (Step 1035).

If there is a match in Step 1030, the node then accesses the contents of the LFSID field 1120 of the header and compares those contents with the contents of the stored LFSID to identify the LU-LU session context of the packet (Step 1040). If the values of the LFSIDs do not match (Step 1045), a default priority is assigned in Step 1046; otherwise, the switching node assigns to the inbound packet the TP level specified by the contents of the stored priority identifier in Step 1050. That is, the DLSw layer 664 maps the packet to a selected TCP session 732–738 (FIG. 7) based on the TP level specified by the priority identifier and loads the packet onto a corresponding queue 772–778 associated with the selected session. TCP/IP driver code within layer 666 of node 650 (FIG. 6) then maps the TP designation of the packet to a predetermined value of precedence bits and configures those bits as a "tag" within a type of is service (TOS) field when building an IP header for the packets during TCP session establishment. Thereafter, the prioritized packet is transferred through the core IP backbone network 605 to the hybrid node 600 in Step 1055 and the operation ends in Step 1060.

Advantageously, the present invention enables the APPN layer of a hybrid node to instruct the DLSw layer of a receiving switching node as to the TP level of an inbound packet destined for the hybrid node. In response to the instruction, the switching node assigns the inbound packet to a particular TCP session, where priority is preserved at intermediate queuing points on the basis of the value of the precedence bits in the IP header.

While there has been shown and described an illustrative embodiment for conveying information pertaining to priority levels of inbound packets transmitted over a heterogeneous network from a switching node to a hybrid node of the network, it is to be understood that various other adaptations and modifications may be made within the spirit and scope of the invention. For example in an alternate embodiment of the invention, a different transport mechanism may be employed in the heterogeneous network to transport different packet formats among the end nodes, such as NetBIOS devices, of the network. Here, another unique, yet well-defined opcode is needed to identify the filter used to convey the priority levels of these different inbound packets over the alternately-configured network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for conveying information pertaining to transmission priority (TP) levels of inbound packets transmitted over a heterogeneous network from a switching node to a hybrid node of the network, the apparatus comprising:
   a predefined communication channel interconnecting the hybrid and switching nodes; and
   a packet-recognizing filter generated by the hybrid node and dynamically transmitted to the switching node over the predefined communication channel, the filter enabling the switching node to classify the inbound packets and assign them appropriate TP levels.

2. The apparatus of claim 1 wherein the predefined communication channel is one of an in-band channel over an existing transport session connection between the nodes and an out-of-band channel over a newly-created transport session between the nodes.

3. The apparatus of claim 2 wherein the filter comprises identifiers identifying attributes of the inbound packets, such that inbound packets matching these identifiers are associated with appropriate TP levels.

4. The apparatus of claim 3 wherein the identifiers comprise a local form session identifier classifying the session context of a specific inbound packet and a priority identifier specifying the TP level of the packet.

5. The apparatus of claim 4 wherein the hybrid node comprises an Advanced Peer to Peer Networking (APPN) protocol layer and a Data Link Switching (DLSw) protocol layer, and wherein the APPN protocol layer passes the identifiers to the DLSw protocol layer of the hybrid node through an application programming interface.

6. The apparatus of claim 5 wherein the DLSw protocol layer encapsulates the identifiers within fields of the filter and transfers the filter over the predefined communication channel.

7. The apparatus of claim 6 wherein the filter further comprises a unique opcode identifying the filter, and wherein the opcode is encapsulated within a switch-to-switch protocol header when transferring the filter over the in-band channel.

8. The apparatus of claim 6 wherein the filter further comprises a unique opcode identifying the filter, and wherein the opcode and additional addressing information are encapsulated within a defined header when transferring the filter over the out-of-band channel.

9. A method for conveying information pertaining to transmission priority (TP) levels of inbound packets transmitted over a heterogeneous network from a switching node to a hybrid node of the network, the method comprising the steps of:

establishing a predefined communication channel interconnecting the hybrid and switching nodes;

generating a packet-recognizing filter at the hybrid node;

dynamically transmitting the filter to the switching node over the predefined communication channel; and assigning the inbound packets TP levels at the switching node using the filter.

10. The method of claim 9 wherein the hybrid node comprises an Advanced Peer to Peer Networking (APPN) protocol layer and a Data Link Switching (DLSw) protocol layer, and wherein the filter comprises identifiers such as a unique opcode identifying the filter, a format identifier (FID) denoting the format of a specific inbound packet, a local form session identifier (LFSID) classifying the session context of the specific inbound packet and a priority identifier specifying a TP level of the packet.

11. The method of claim 10 wherein the step of generating comprises the step of passing the identifiers from the APPN protocol layer to the DLSw protocol layer of the hybrid node through an application programming interface (API).

12. The method of claim 11 wherein the step of generating further comprises the step of encapsulating the identifiers within fields of the filter at the DLSw layer in response to the API.

13. The method of claim 12 wherein the predefined communication channel is an in-band channel over one of a plurality of existing transport session connections between the nodes or an out-band channel over a newly-created transport session between the nodes.

14. The method of claim 13 wherein the step of generating further comprises one of the steps of:

when transferring the filter over the one in-band channel, encapsulating the opcode within a switch-to-switch protocol header; and when transferring the filter over the out-band channel, encapsulating the opcode and additional addressing information within fields of a defined header.

15. The method of claim 14 further comprising, after the step of dynamically transferring, the steps of:

receiving the filter at a DLSw protocol layer of the switching node;

parsing the fields of the filter;

storing the LFSD, FID and priority identifier in a temporary storage location of the switching node; and examining each inbound packet prior to forwarding the inbound packet to the hybrid node.

16. The method of claim 15 wherein the step of examining further comprises the steps of:

initially determining the format of the inbound packet;

if the format of the inbound packet is equal to the format specified by the stored FID, comparing the LFSID of the inbound packet with the stored LFSID; and if the LFSIDs match, assigning the inbound packet the TP level specified by the stored priority identifier.

17. The method of claim 16 further comprising the step of, after the step of assigning, forwarding the inbound packet to the hybrid node over an appropriate one of the existing transport session connections.

18. A computer readable medium containing executable program instructions for conveying information pertaining to transmission priority (TP) levels of inbound packets transmitted over a heterogeneous network from a switching node to a hybrid node of the network, the executable program instructions comprising program instructions for:

generating a packet-recognizing filter at the hybrid node;

dynamically transmitting the filter to the switching node over a predefined communication channel interconnecting the hybrid and switching nodes, wherein the predefined communication channel is an in-band channel over one of an existing transport session connection between the nodes and an out-band channel over a newly-created transport session between the nodes; and assigning the inbound packets TP levels at the switching node using the filter.

19. The medium of claim 18 wherein the program instructions for generating comprises program instructions for encapsulating identifiers within fields of the filter.

20. The medium of claim 19 wherein the program instructions for generating further comprises program instructions for:

encapsulating the opcode within a first header when transferring the filter over the in-band channel; and encapsulating the opcode and additional addressing information within fields of a second header when transferring the filter over the out-band channel.

21. Apparatus for conveying information pertaining to transmission priority (TP) levels of inbound packets transmitted over a heterogeneous network from a switching node, the apparatus comprising:

a hybrid node for being coupled to a predefined communication channel for interconnecting the hybrid node and the switching node, the hybrid node being configured to generate a packet-recognizing filter for being transmitted to the switching node over the predefined communication channel, the filter enabling the switching node to classify the inbound packets and assign them appropriate TP levels.

* * * * *